US007124778B2

(12) United States Patent
Miyazoe et al.

(10) Patent No.: US 7,124,778 B2
(45) Date of Patent: Oct. 24, 2006

(54) VALVE HAVING JUNCTION TYPE HOUSING

(75) Inventors: Shinji Miyazoe, Tsukuba-gun (JP); Junichi Itagaki, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 283 days.

(21) Appl. No.: 10/928,243

(22) Filed: Aug. 30, 2004

(65) Prior Publication Data

US 2005/0061376 A1 Mar. 24, 2005

(30) Foreign Application Priority Data

Sep. 24, 2003 (JP) ............................ 2003-332265

(51) Int. Cl.
*F15B 13/043* (2006.01)
*F16K 27/04* (2006.01)

(52) U.S. Cl. .......................... 137/625.64; 137/625.66; 251/367

(58) Field of Classification Search ........... 137/625.64, 137/625.66, 884; 251/367
See application file for complete search history.

(56) References Cited

U.S. PATENT DOCUMENTS 1,787,628 A * 1/1931 Jones ......................... 251/367
2,295,111 A * 9/1942 Hemmings .................. 251/367
4,515,184 A * 5/1985 Bownass et al. ....... 137/625.66
4,748,897 A * 6/1988 Hoge et al. ................ 251/367
4,770,210 A * 9/1988 Neff et al. ................. 137/884
5,361,803 A 11/1994 Stoll
5,459,953 A * 10/1995 Fukano et al. ......... 137/625.64
5,487,409 A * 1/1996 Stoll et al. ............ 137/625.64
5,606,993 A * 3/1997 Stoll ..................... 137/596.18
5,829,481 A * 11/1998 Tajima et al. ............... 137/884
6,820,859 B1 * 11/2004 Miyazoe et al. ............ 251/367

FOREIGN PATENT DOCUMENTS

JP 2003-65453 3/2003

* cited by examiner

*Primary Examiner*—John Rivell
(74) *Attorney, Agent, or Firm*—Oblon, Spivak, McClelland, Maier & Neustadt, P.C.

(57) ABSTRACT

A first housing member and a second housing member are divided by a dividing surface including a center axis of a valve hole. Connecting holes are formed in joint surfaces of the respective housing members at locations of the joint surfaces opposed to each other. Connecting pins are inserted into the connecting holes, the connecting holes and the connecting pins are fixed to each other through solder, thereby integrally connecting the first housing member and the second housing member to each other to form a housing.

7 Claims, 4 Drawing Sheets

VALVE HAVING JUNCTION TYPE HOUSING

TECHNICAL FIELD

The present invention relates to a valve having a junction type housing which is formed by connecting a plurality of housing members to one another.

BACKGROUND ART

As described in U.S. Pat. No. 5,361,803 for example, a valve having a junction type housing formed by connecting a plurality of housing members to one another is conventionally known. In this conventional valve, the housing is divided into upper and lower two housing members from a division surface including an axis of a valve hole. These housing members are connected to each other, and joint surfaces thereof are integrally connected to each other by adhesion or welding.

In such a junction type housing, when the two housing members are to be connected to each other, they are prone to be deviated from each other and thus, it is necessary to hold both the housing member so that they are not deviated from each other in some way. If both the housing members are deviated in position and connected to each other, when the valve hole is formed thereafter, a working margin is increased by the deviated amount, and labor and time required for forming the valve hole are increased and thus, the costs are increased. Since the conventional valve does not have means to position the housing members at the time of connection thereof, it is difficult to precisely connect the housing members to each other.

On the other hand, Japanese Patent Application Laid-open No. 2003-65453 discloses a technique for soldering the two housing members in a state in which they are positioned by fitting a convex portion and a concave portion to each other. However, since a slight gap exists between the convex portion and the concave portion, the two housing members are deviated and moved, and the positioning precision is deteriorated in some cases. In order to eliminate the gap to enhance the positioning precision, it is necessary to form the convex portion and the concave portion with high fitting precision, and labor is required for producing the housing members.

DISCLOSURE OF THE INVENTION

In a valve having a junction type housing formed by connecting two housing members to each other, it is an object of the present invention to make it possible to precisely connecting the housing members to each other while reliably preventing the positional deviation of the housing members.

To achieve the above object, the present invention provides a valve having a junction type housing, the housing comprising a valve hole through which a valve rod moves, a plurality of ports which are in communication with the valve hole, and a substantially flat mounting surface to be mounted on a sub-plate, wherein the housing comprises an upper first housing member and a lower second housing member which are divided by a dividing surface including a center axis of the valve hole, a plurality of connecting holes extending perpendicular to opposed joint surfaces of the housing members and a plurality of connecting pins which are fitted into opposed connecting holes are formed in the opposed joint surfaces of the housing members such that the connecting holes and the connecting pins are opposed to each other, the connecting holes and the connecting pins functions as positioning mechanisms and connecting mechanisms, solder is applied to inner surfaces of the connecting holes and/or outer surfaces of the connecting pins to fix the connecting pins and the connecting holes to each other, thereby integrally connecting the first housing member and the second housing member with each other in a state in which they are positioned.

In the invention, it is preferable that solder in such an amount that the solder does not come out from the holes when the connecting holes and the connecting pins are fitted and connected to each other is applied to the inner surfaces of the connecting holes and/or the outer surfaces of the connecting pins. In the invention, a sealing member for keeping a hermetical state may be interposed between the entire joint surfaces of the first housing member and the second housing member. Alternatively, the joint surfaces of the first housing member and the second housing member may be entirely connected to each other through solder.

According to a concrete structure of the invention, the first housing member and the second housing member respectively includes screw-inserting holes which are brought into communication with each other when the housing members are connected to each other, the screw-inserting holes are formed at two locations between the opposed joint surfaces of the housing members, the screw-inserting holes are located on opposite sides with respect to the valve hole on one end side and the other end side of the valve hole in an axial direction thereof, the connecting holes are also formed in two locations in a positional relation opposite from the relation of the screw-inserting holes.

According to the present invention, the connecting holes and the connecting pins functioning as the positioning mechanisms and the connecting mechanisms are provided in the joint surfaces of the housing members at locations of the joint surfaces opposed to each other, and the solder is applied to the inner surfaces of the connecting holes and/or the outer surfaces of the connecting pins to fix the connecting holes and the connecting pins. With this, the housing members can precisely be formed as one member in a state in which the housing members are reliably prevented from being deviated in positions of the connecting holes and the connecting pins.

BEST MODE FOR CARRYING OUT THE INVENTION

Figure 1:
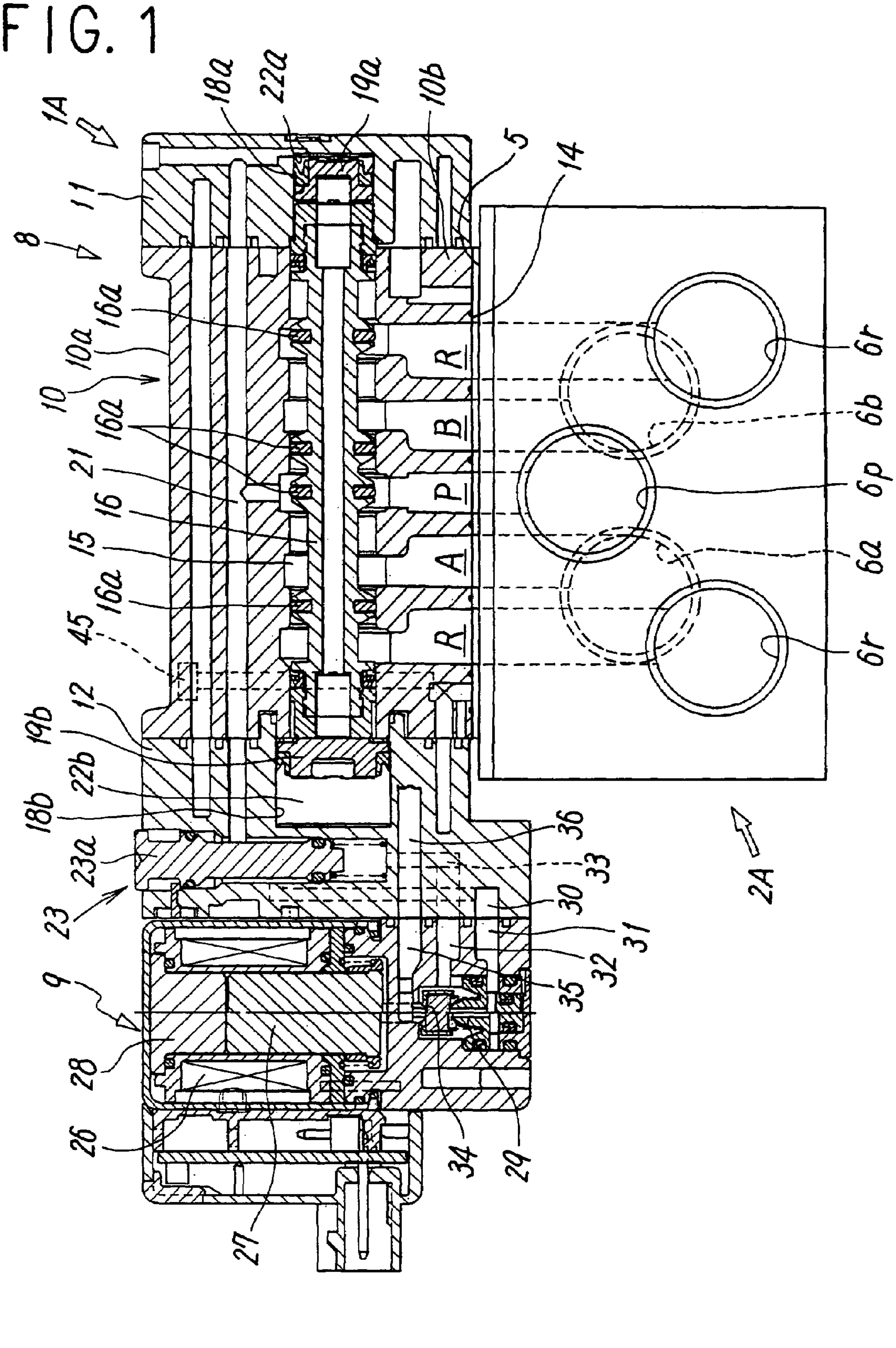
FIG. 1 shows a first embodiment of a valve of the present invention, and is a sectional view of the valve mounted on a sub-plate.

FIGS. 1 to 4 show a first embodiment of a valve having a junction type housing according to the present invention. FIG. 1 shows a valve assembly formed by mounting the valve 1A on a sub-plate 2A.

The sub-plate 2A comprises a block having a rectangular cross section. The sub-plate 2A is provided at its upper surface with a substantially flat mounting surface 5 on which the valve 1A is to be mounted. The sub-plate 2A is provided therein with one supply passage 6*p* for supplying pressure fluid such as compressed air to the valve 1A, two output passages 6*a* and 6*b* for supplying, to an actuator such as an air cylinder, pressure fluid which is output from the valve 1A, and two discharge passages 6*r* and 6*r* for discharging the pressure fluid from the actuator. These passages are opened at the mounting surface 5. Ends of the passages 6*p*, 6*a*, 6*b*, 6*r* and 6*r* are pipe connection openings so that pipes can be connected.

Figure 2:
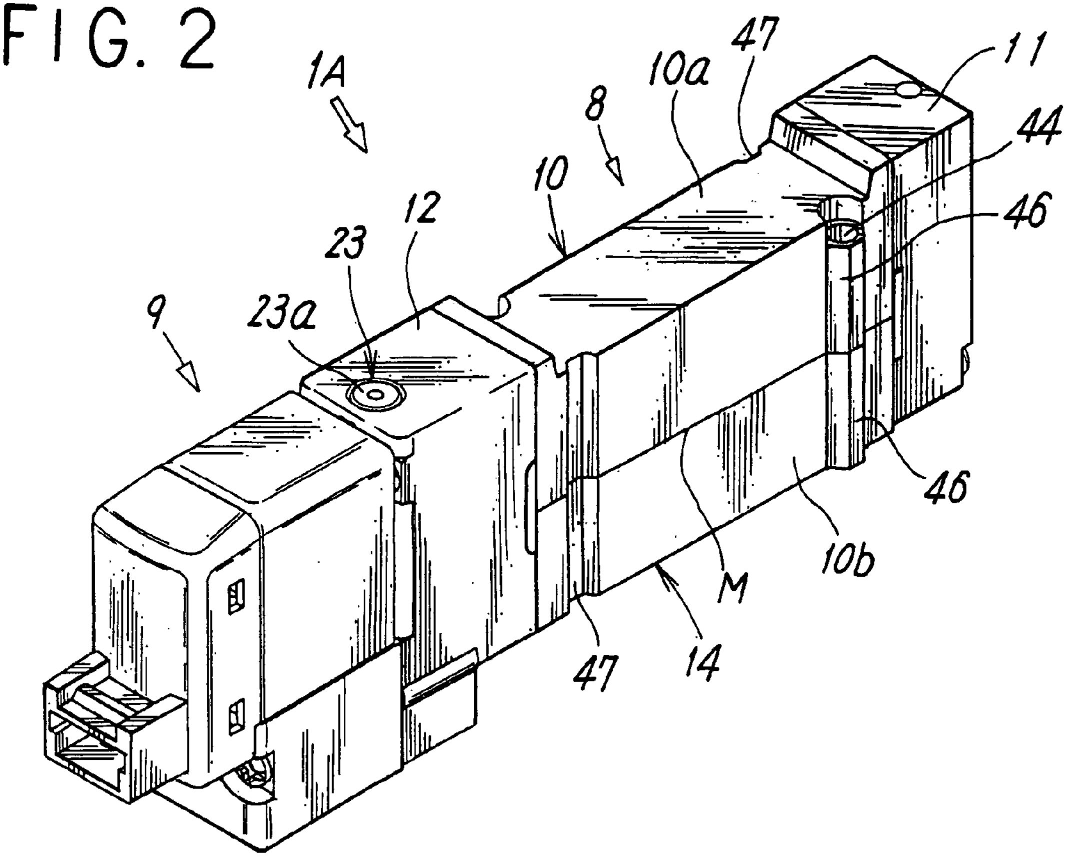
FIG. 2 is a perspective view of the valve.

The valve 1A is a single solenoid pilot type 5-port valve. As shown in FIG. 2, the valve 1A comprises a main valve portion 8 and an electromagnetic operation section 9.

The main valve portion 8 includes a housing 10 located at a central position thereof, and first and second end blocks 11 and 12 mounted on both end surface of the housing 10 in its axial direction. The housing 10 is formed at its lower surface with a substantially flat mounting surface 14 to be mounted on the mounting surface 5 of the sub-plate 2A. A valve hole 15 is formed in the housing 10 through which the housing 10 passes in the axial direction. A valve rod 16 is movably accommodated in the valve hole 15. The valve rod 16 includes a plurality of seal members 16*a* which slide on an inner surface of the valve hole 15. The valve rod 16 is of a spool type for switching the passages by the seal members 16*a*. Alternatively, the valve rod 16 may be a poppet valve which opens and closes a valve seat provided in the valve hole 15. The one supply port P which is in communication with the valve hole 15, the two output ports A and B located on opposite sides of the supply port P, and the two discharge ports R and R located further on the opposite sides thereof are opened at the lower mounting surface 14 of the housing 10. When the valve 1A is mounted on the mounting surface 5 of the sub-plate 2A, the ports P, A, B, R and R are respectively brought into communication with the corresponding passages 6*p*, 6*a*, 6*b*, 6*r* and 6*r*.

The first and second end blocks 11 and 12 are respectively formed with piston chambers 18*a* and 18*b*. Pistons 19*a* and 19*b* for driving the valve rod 16 are slidably incorporated in the piston chambers 18*a* and 18*b*, respectively. The piston chamber 18*a* formed in the first end block 11 has a small diameter, and the first piston 19*a* having a small pressure-receiving area and a small diameter is accommodated in the piston chamber 18*a*. The piston chamber 18*b* formed in the second end block 12 has a large diameter, and the second piston 19*b* having a large pressure-receiving area and a large diameter is accommodated in the piston chamber 18*b*.

A pilot passage 21 which is in communication with the supply port P penetrates the housing 10 in parallel to the valve hole 15. One end of the pilot passage 21 is always in communication with a first pressure-receiving chamber 22*a* provided behind the first piston 19*a* through a passage in the first end block 11. The other end of the pilot passage 21 is in communication with a second pressure-receiving chamber 22*b* provided behind the second piston 19*b* through a manually operating mechanism 23 provided in the second end block 12. When an operating member 23*a* is pushed down, the manually operating mechanism 23 brings the pilot passage 21 into communication with the second pressure-receiving chamber 22*b*. A structure and a function of the manually operating mechanism are the same as those of a known mechanism.

The electromagnetic operation section 9 is mounted on an end surface of the second end block 12, and has a structure as a 3-port type solenoid valve. If a coil 26 is energized, as shown in a left half with respect to the axis L, a moving core 27 is adsorbed into a stationary core 28 and the pilot supply valve seat 29 is opened. Thus, pilot fluid from the pilot passage 21 is supplied to the second pressure-receiving chamber 22*b* through a pilot input passage 30, a pilot input port 31, the pilot supply valve seat 29, a pilot output port 32 and a pilot communication passage 33, and the second piston 19*b* having the large diameter moves rightward in the drawing due to a difference between the pressure-receiving areas of the first piston 19*a* and the second piston 19*b*, and the valve rod 16 occupies a switch position shown in FIG. 1.

If the current supply to the coil 26 is stopped, as shown in the right half with respect to the axis L, the moving core 27 is separated from the stationary core 28, and the pilot discharge valve seat 34 is opened. Thus, the pilot fluid in the second pressure-receiving chamber 22*b* is discharged out through the pilot communication passage 33, the pilot output port 32, the pilot discharge valve seat 34, a pilot discharge port 35 and a pilot discharge passage 36. Therefore, the valve rod 16 is moved leftward in the drawing by the fluid pressure acting on the first piston 19*a*, and the valve rod 16 occupies a switch position which is opposite from that shown in FIG. 1. Such a structure of the electromagnetic operation section 9 is well known as general single solenoid pilot type valve and thus, further explanation will be omitted.

Figure 3:
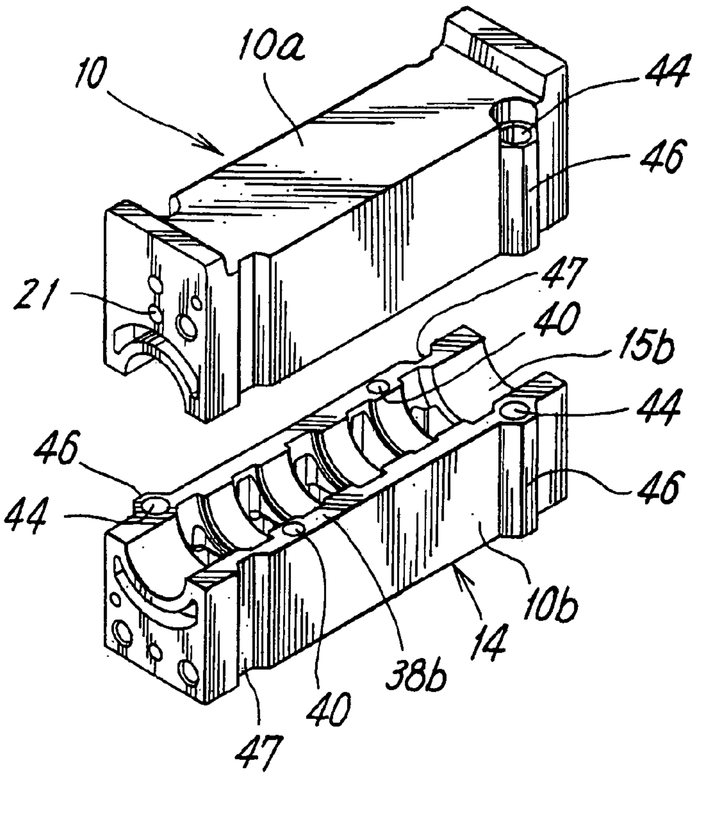
FIG. 3 is an exploded perspective view of a first housing member and a second housing member which constitute a housing of the valve of the first embodiment.
Figure 4:
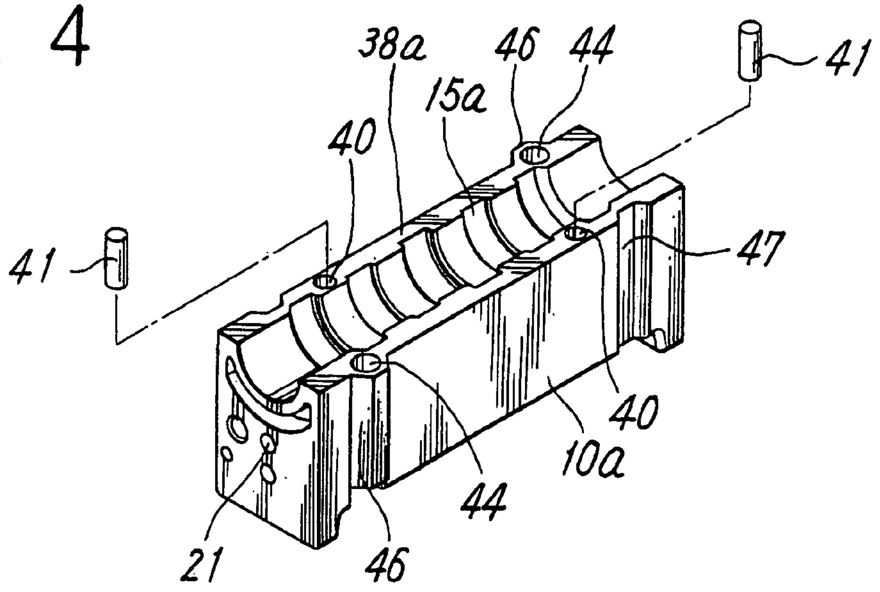
FIG. 4 is a perspective view of vertically flipped first housing member.

As shown in FIGS. 3 and 4 also, the housing 10 of the valve 1A is divided by a dividing surface M including a center axis of the valve hole 15 into an upper first housing member 10*a* and a lower second housing member 10*b*. These housing members 10*a* and 10*b* are connected to each other and integrally formed as one member. The dividing surface M is substantially in parallel to the mounting surface 14 which is a lower surface of the housing 10.

The housing members 10*a* and 10*b* are formed of aluminum based material by die casting. As shown in FIG. 4, the upper first housing member 10*a* is formed with a half hole portion 15*a* constituting an upper half of the valve hole 15 and the pilot passage 21. The lower second housing member 10*b* is formed with a half hole portion 15*b* constituting a lower half of the valve hole 15, the mounting surface 14 and the ports P, A, B, R and R which are opened at the mounting surface 14.

A plurality of connecting holes 40 are formed in opposed positions of the joint surfaces 38*a* and 38*b* of the housing members 10*a* and 10*b*. The connecting holes 40 constitute a positioning mechanism for positioning the housing members 10*a* and 10*b* with respect to each other in corporation with connecting pins 41, and a connecting mechanism which solders the housing members 10*a* and 10*b* to each other. In the illustrated example, two connecting holes 40 extending perpendicular to the joint surfaces 38*a* and 38*b* are provided, and the connecting holes 40 are formed in the joint surfaces 38*a* and 38*b* on one end side and the other end side thereof in the axial direction of the valve hole 15 and on the opposite sides of the joint surfaces 38*a* and 38*b* with respect to the valve hole 15.

Two screw-inserting holes 44 are formed in opposed portions of the joint surfaces 38*a* and 38*b* of the housing members 10*a* and 10*b*. The screw-inserting holes 44 are brought into communication with each other when the housing members 10*a* and 10*b* are connected to each other. When the valve 1A is fixed to the sub-plate 2A, fixing screws 45 are inserted into the screw-inserting holes 44. Projecting stripes 46 project from side surfaces of the housing members 10*a* and 10*b*. The screw-inserting holes 44 are formed in the projecting stripes 46 in a relation opposite from the connecting holes 40 with respect to the valve hole 15. That is, on one end side of the valve hole 15 in the axial direction, the connecting holes 40 and the screw-inserting holes 44 are formed at positions diagonally opposed to each other with respect to the valve hole 15, and on the other end side of the valve hole 15 in the axial direction, the connecting holes 40 and the screw-inserting holes 44 are formed in a relation opposite from the above relation with respect to the valve hole 15. Grooves 47 are formed in the housing members 10*a* and 10*b* at locations completely opposed to the projecting stripes 46. The groove 47 has such a size that the projecting stripe 46 is fitted thereinto. The connecting holes 40 and the screw-inserting holes 44 are not completely opposed to each other, and the connecting holes 40 are slightly closer to centers (inner side) of the housing members 10*a* and 10*b* than the screw-inserting holes 44.

Both the housing members 10*a* and 10*b* are integrally connected to each other in such a manner that the connecting pins 41 are inserted into the opposed connecting holes 40 such that the connecting pins 41 exist in both the housing members 10*a* and 10*b*, i.e., one of the half portions of the connecting pins 41 are fitted into the connecting holes 40 of the first housing member 10*a* and the other half portions of the connecting pins 41 are fitted into the connecting holes 40 of the second housing member 10*b*, and the connecting holes 40 and the connecting pins 41 are soldered and fixed to each other. When the connecting pins 41 are soldered and fixed into the connecting holes 40, it is preferable that at least one of inner surfaces of the connecting holes 40 and outer surfaces of the connecting pins 41 are previously coated with solder, the connecting holes 40 are inserted into the connecting holes 40 and then, the housing members 10*a* and 10*b* are heated while pressing them against each other, thereby melting the solder and then, the solder is cooled and solidified.

It is preferable that the amount of solder to be coated on the inner surfaces of the connecting holes 40 and/or the outer surfaces of the connecting pins 41 is determined such that when the connecting pins 41 are fitted into and connected with the connecting holes 40, the solder does not come out from the holes. With this, solder does not come out from the joint surfaces 38*a* and 38*b* and thus, excellent finished state can be obtained, and it is unnecessary to remove the come out portion of the solder by a secondary operation.

Concerning portions of the joint surfaces 38*a* and 38*b* of the housing members 10*a* and 10*b* other than the connecting holes 40, it is not always necessary to connect these portions by soldering, but the portions of the joint surfaces 38*a* and 38*b* other than the connecting holes 40 may previously be coated with solder in such an amount that the solder does not come out from the joint surfaces and the entire joint surfaces 38*a* and 38*b* are connected to each other by solder. When the entire joint surfaces 38*a* and 38*b* are not connected to each other by solder, in order to keep the hermetical state between the joint surfaces 38*a* and 38*b*, it is preferable that synthetic resin thin films or sealing members are interposed between the joint surfaces 38*a* and 38*b*.

The connecting holes 40 and the connecting pins 41 which function as both the positioning mechanisms and the connecting mechanisms are provided, and the connecting holes 40 and the connecting pins 41 are connected to each other by solder. Therefore, the housing members 10*a* and 10*b* can be connected to each other in a state in which gaps between the connecting holes 40 and the connecting pins 41 are completely eliminated and thus, the housing members 10*a* and 10*b* can precisely be connected to each other in a state in which they are precisely positioned. Further, since the connecting center is determined at a constant position by the connecting pins 41 and the connecting holes 40, variation in connecting strength is not generated, the housing members 10*a* and 10*b* can be connected with each other with the constant connecting strength, and quality thereof is stabilized.

The outer surfaces of the housing 10 obtained in this manner and an inner surface of the valve hole 15 are subjected to a finishing touch such as cutting or polishing and then, the valve rod 16 is inserted into the valve hole 15, the first and second end blocks 11 and 12 are connected to both the ends, the electromagnetic operation section 9 is mounted on the outer side of the second end block 12, the housing 10 is assembled as the valve 1A, and the valve 1A is fixed to the mounting surface 5 of the sub-plate 2A by the screw 45. At that time, the valve 1A is fixed to the sub-plate 2A by the screw 45 and at the same time, the first and second housing members 10*a* and 10*b* are fastened in the tangent direction by the screw 45. Therefore, the connection strength therebetween is further increased, and when repulsion caused by pressurized fluid or external force from a pipe is applied, lasting power is extremely high and safety is high.

Although FIG. 1 shows the valve assembly in which the one valve 1A is mounted on the single-type sub-plate 2A, a plurality of valves may be mounted on an assembly-type sub-plate having a plurality of mounting surfaces. In this case, output passages are provided such that they respectively correspond to the valves.

Figure 5:
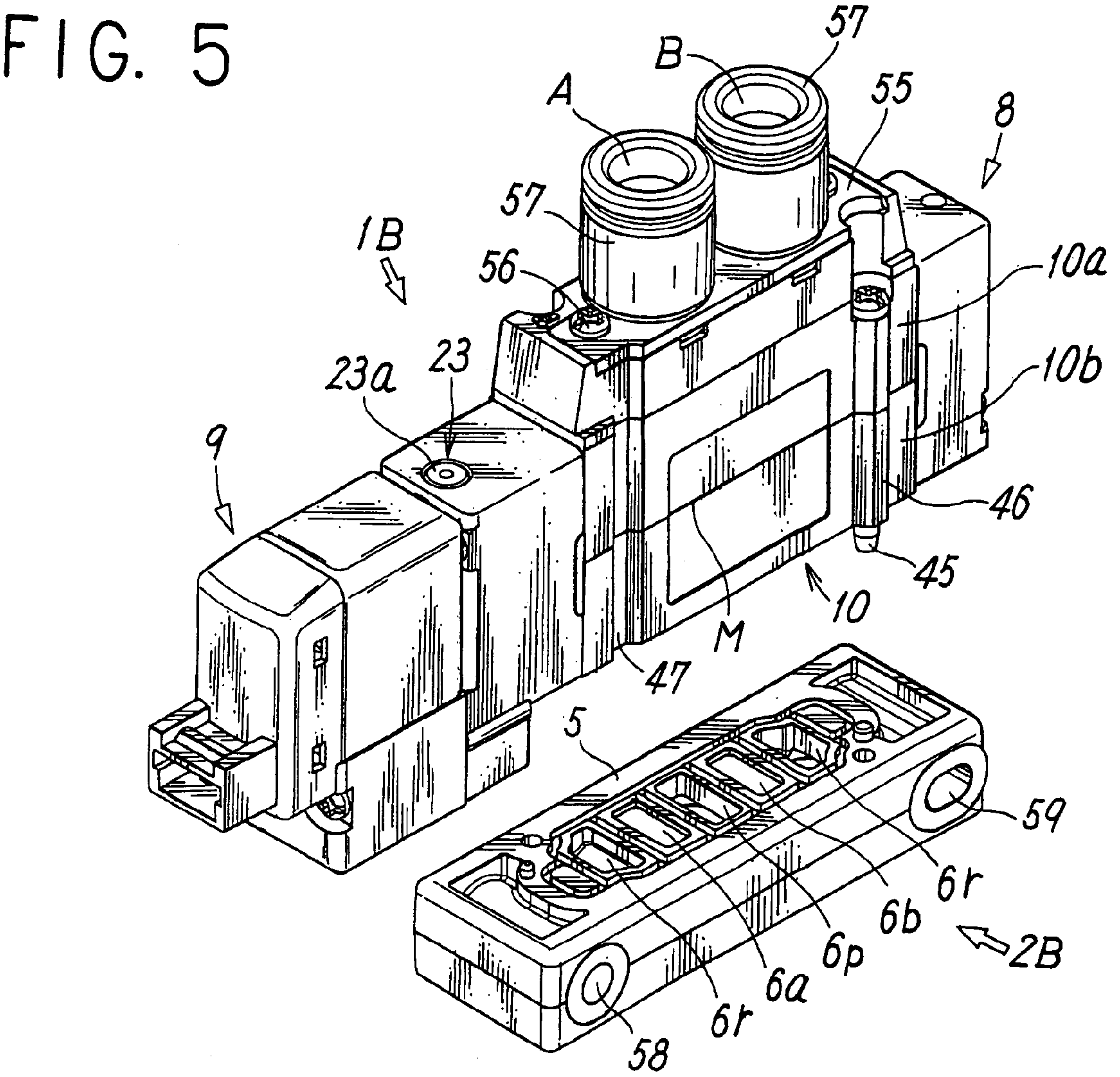
FIG. 5 shows a second embodiment of a valve of the invention, and is a perspective view of a state in which the valve is not mounted on the sub-plate.
Figure 6:
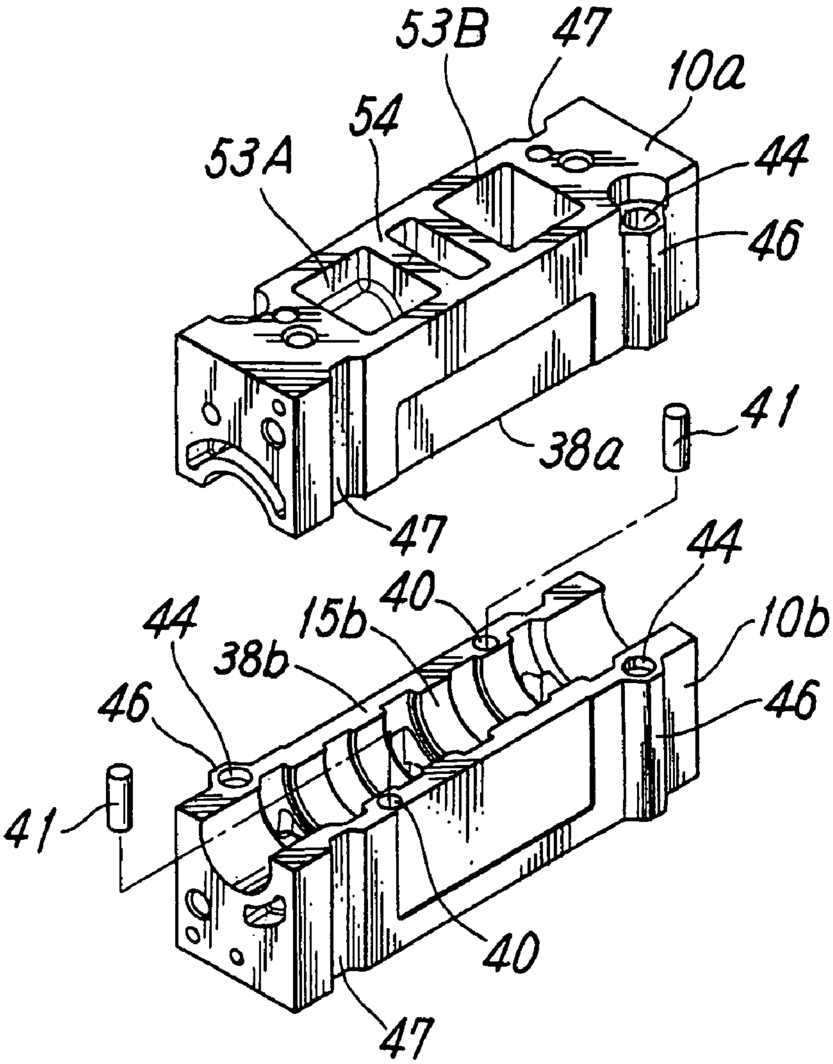
FIG. 6 is an exploded perspective view of a first housing member and a second housing member which constitute a housing of the valve of the second embodiment.

FIGS. 5 and 6 show a second embodiment of a valve of the present invention. The valve 1B of the second embodiment is different from the valve 1A of the first embodiment in that the valve 1A of the first embodiment is a base pipe type valve but the valve 1B of the second embodiment is a direct piping type valve. That is, in the case of the valve 1A of the first embodiment, the output ports A and B are in communication with the output passages 6*a* and 6*b* of the sub-plate 2A, and the valve 1A is connected to the actuator through the sub-plate 2A. In the case of the valve 1B of the second embodiment, the output ports A and B are formed on an upper surface of the main valve portion 8, and a pipe from the actuator is directly connected to the output ports A and B.

The structure of the valve 1B of the second embodiment will further be explained. The first and second housing member 10*a*, 10*b* constitute the housing 10. A block mounting surface 54 having two output holes 53A and 53B which are in communication with the valve hole 15 is formed on an upper surface of the upper first housing member 10*a*. A port block 55 is fixed to the block mounting surface 54 through a screw 56. The port block 55 includes two output ports A and B which are in communication with the output holes 53A and 53B. Quick connection type pipe joints 57 are respectively mounted on the output ports A and B, and the pipes are connected the pipe joints 57. Therefore, one supply port P and two discharge ports R and R are provided on the lower mounting surface 14 of the lower second housing member 10*b*, and the output ports A and B are not provided on the mounting surface 14.

The valve 1A is mounted on a sub-plate 2B. The sub-plate 2B can also be used for the base piping type valve 1A. An upper surface of the sub-plate 2B is the mounting surface 5. The supply passage 6*p*, the output passages 6*a* and 6*b* and the discharge passages 6*r* and 6*r* are opened at the mounting surface 5. Pipe connection openings which are in communication with these passages are formed in a lower surface of the sub-plate 2B. The pipe connection openings are not shown in the drawings. In the second embodiment, since the direct piping type valve 1B is mounted on the mounting surface 5, the output passages 6*a* and 6*b* and the pipe connection opening which are in communication with the output passages 6*a* and 6*b* do not function.

In the drawings, reference numbers 58 and 59 represent mounting holes through which screws for mounting the sub-plate 2B on predetermined positions are inserted.

Other structure and function or preferred modifications of the second embodiment are substantially the same as those of the first embodiment and thus, the same constituent elements are designated with the same symbols as those of the first embodiment, and explanation thereof will be omitted.

Although the valves 1A and 1B of the embodiments are single solenoid pilot type 5-port valves, the valves 1A and 1B are not limited to such valves, and double solenoid valves, 3-port or 4-port valves may also be employed.

The invention claimed is:

1. A valve having a junction type housing, the housing comprising a valve hole through which a valve rod moves, a plurality of ports which are in communication with the valve hole, and a substantially flat mounting surface to be mounted on a sub-plate, wherein the housing comprises an upper first housing member and a lower second housing member which are divided by a dividing surface including a center axis of the valve hole, a plurality of connecting holes extending perpendicular to opposed joint surfaces of the housing members and a plurality of connecting pins which are fitted into opposed connecting holes are formed in the opposed joint surfaces of the housing members such that the connecting holes and the connecting pins are opposed to each other, the connecting holes and the connecting pins functions as positioning mechanisms and connecting mechanisms, solder is applied to inner surfaces of the connecting holes and/or outer surfaces of the connecting pins to fix the connecting pins and the connecting holes to each other, thereby integrally connecting the first housing member and the second housing member with each other in a state in which they are positioned.

2. The valve according to claim 1, wherein solder in such an amount that the solder does not come out from the holes when the connecting holes and the connecting pins are fitted and connected to each other is applied to the inner surfaces of the connecting holes and/or the outer surfaces of the connecting pins.

3. The valve according to claim 1 or 2, wherein a sealing member for keeping a hermetical state is interposed between the entire joint surfaces of the first housing member and the second housing member.

4. The valve according to claim 1 or 2, wherein the joint surfaces of the first housing member and the second housing member are entirely connected to each other through solder.

5. The valve according to claim 1 or 2, wherein the first housing member and the second housing member respectively includes screw-inserting holes which are brought into communication with each other when the housing members are connected to each other, the screw-inserting holes are formed at two locations between the opposed joint surfaces of the housing members, the screw-inserting holes are located on opposite sides with respect to the valve hole on one end side and the other end side of the valve hole in an axial direction thereof, the connecting holes are also formed in two locations in a positional relation opposite from the relation of the screw-inserting holes.

6. The valve according to claim 3, wherein the first housing member and the second housing member respectively includes screw-inserting holes which are brought into communication with each other when the housing members are connected to each other, the screw-inserting holes are formed at two locations between the opposed joint surfaces of the housing members, the screw-inserting holes are located on opposite sides with respect to the valve hole on one end side and the other end side of the valve hole in an axial direction thereof, the connecting holes are also formed in two locations in a positional relation opposite from the relation of the screw-inserting holes.

7. The valve according to claim 4, wherein the first housing member and the second housing member respectively includes screw-inserting holes which are brought into communication with each other when the housing members are connected to each other, the screw-inserting holes are formed at two locations between the opposed joint surfaces of the housing members, the screw-inserting holes are located on opposite sides with respect to the valve hole on one end side and the other end side of the valve hole in an axial direction thereof, the connecting holes are also formed in two locations in a positional relation opposite from the relation of the screw-inserting holes.

* * * * *